No. 764,692. PATENTED JULY 12, 1904.
W. J. SUMNER.
OVERHEAD TROLLEY.
APPLICATION FILED FEB. 6, 1904.
NO MODEL.
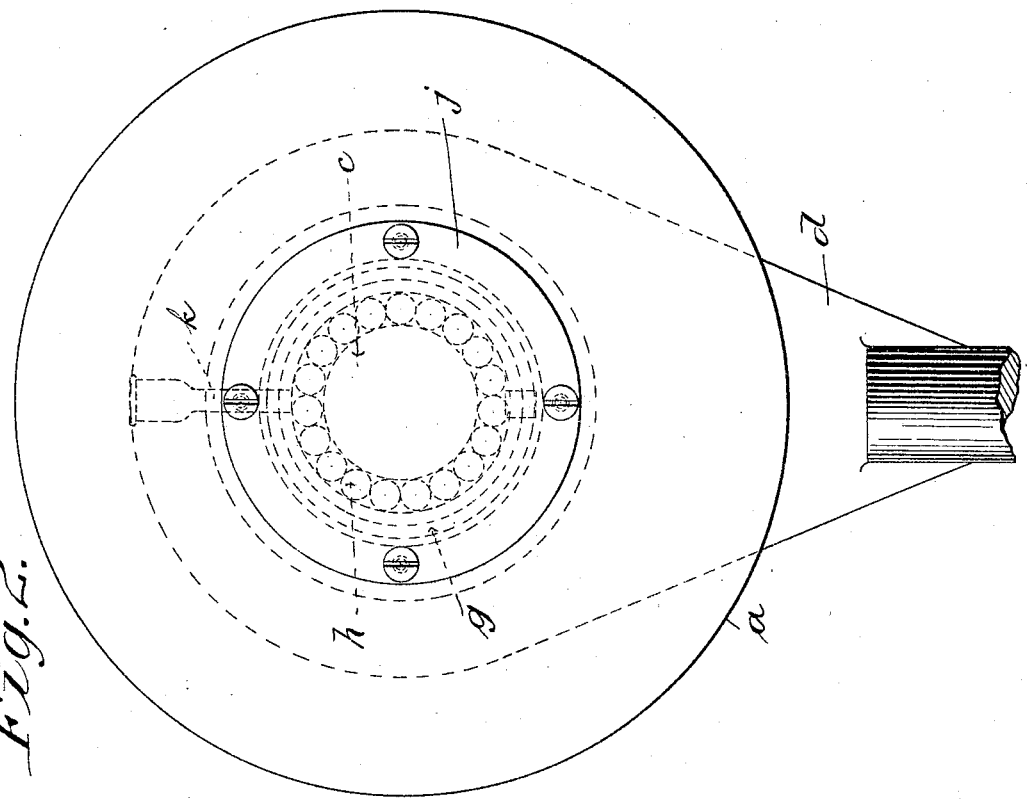
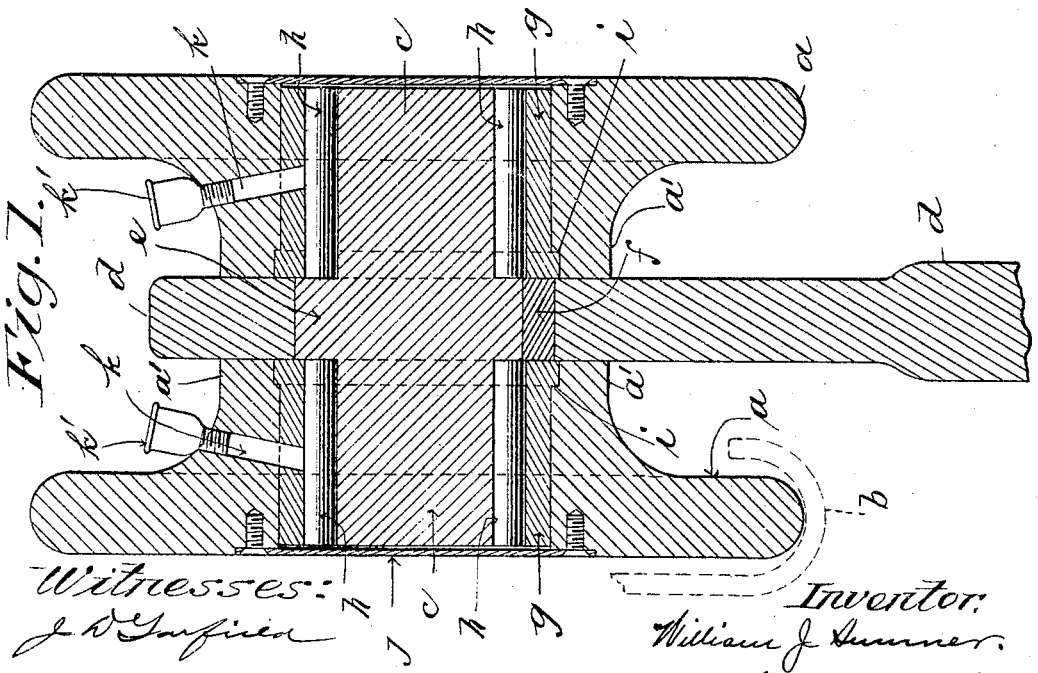
Witnesses:
J. D. Garfield
M. E. Crosier
Inventor:
William J. Sumner
by Chapin & Co.
Attorneys No. 764,692. Patented July 12, 1904.

UNITED STATES PATENT OFFICE.

WILLIAM J. SUMNER, OF HOLYOKE, MASSACHUSETTS, ASSIGNOR TO COBURN TROLLEY TRACK MANUFACTURING COMPANY, OF WILLIMANSETT, MASSACHUSETTS, A CORPORATION.

OVERHEAD TROLLEY.

SPECIFICATION forming part of Letters Patent No. 764,692, dated July 12, 1904.

Application filed February 6, 1904. Serial No. 192,353. (No model.)

*To all whom it may concern:*

Be it known that I, WILLIAM J. SUMNER, a citizen of the United States of America, residing at Holyoke, in the county of Hampden and State of Massachusetts, have invented new and useful Improvements in Overhead Trolleys, of which the following is a specification.

This invention relates to trolleys for overhead tracks, and it is especially applicable to tracks of this character in which the runway for the wheel of the trolley is of trough shape, these runways being usually arranged in pairs and the trolley provided with two wheels having a common axis.

The object of this invention is to provide an improved trolley comprising wheels independently revoluble on a common axis and possessing certain novel features of construction, which will be fully described in the following specification and which are illustrated in the accompanying drawings, in which—

Figure 1 is a vertical sectional view of a trolley embodying this invention. Fig. 2 is a side elevation of the same.

Referring now to the drawings, $a$ may indicate the wheels, which travel in the runways of a track, a portion of which only is shown in dotted lines in Fig. 1 and indicated by $b$. The wheels $a$ are identical in construction and rotate on a stud $c$, rigidly supported in a pendant $d$ at right angles thereto, said pendant extending downwardly from the trolley and provided with a hook or some other means for supporting whatever is to be carried by the trolley. The pendant is bored out to receive the stub $c$, having an enlarged central portion $e$, which enters the hole in the pendant made to receive it and is secured therein by a key $f$ or by any other suitable means which will secure it non-rotatably therein with its axis at right angles to said pendant.

The wheels $a$ are made of cast iron and are each provided with an inwardly-extending hub $a'$, the outer sides of the wheels consisting of a plane surface, whereby the trolley is adapted to fit closely in the various forms of tubular track well known commercially. The wheels are bored out large enough to receive a bushing $g$, of steel, the latter being of such diameter interiorly as to permit the introduction between the bearing-surface of the stud $c$ and said bushing of a number of rolls $h$, whereby the rotation of the wheels on the stud is made as easy as possible. The bushings $g$, preferably, are made with a flanged inner end, indicated at $i$, which end will bear partly upon the central portion of the stud $c$ and the side of the pendant $d$, the thickness of said pendant being the same as the width of the enlargement $e$ of the stud.

In assembling these parts the wheel $a$, having its bushing properly located therein, is slipped over one end of the stud $c$, which may be then held in a vertical position, and the rolls $h$ may then be inserted in the annular space between the stud and the bushing, a circular plate $j$, flush with the side of the wheel, being secured to the latter by screws or otherwise to cover the ends of the bushing, rolls, and stud. The device may be reversed and the opposite wheel placed on the stud in the same manner. Preferably oil-tubes $k$ are provided, one for each wheel, whose ends are closed by screw-caps $k'$. The trolley having been properly assembled, it may be applied to a track, and the engagement of the wheels thereof with the track will keep said wheels in position on the ends of the stud $c$ and at the same time permit the stud to play endwise in the wheel should the track vary in width. Furthermore, the wheels being independently revoluble on the stud, this construction will permit the trolleys to pass around a curve without undue friction, as the wheels will readily adapt themselves to the different radii on which they move in rounding the curve. This construction permits the wheel to bear throughout the entire thickness thereof and obviates all projections beyond the plane of the outer side of the wheel, thus permitting the latter to be run in a narrower track, if that track is of the tubular type, such as has been hereinbefore referred to.

It would obviously fall within the scope of the invention if the wheels *a* were flanged and run on rails instead of making the track trough shaped, as shown and described herein.

Having thus described my invention, what I claim, and desire to secure by Letters Patent of the United States, is—

1. A trolley of the character described comprising a pendant, a stud non-rotatably secured therein at right angles thereto, a trolley-wheel rotatably mounted on the stud, and having a bearing thereon extending from side to side of the wheel, antifriction-rolls located between the wheel and the stud, and a plate secured to the side of the wheel, substantially flush therewith, to cover the bearing in the wheel.

2. A trolley of the character described comprising a pendant, a stud non-rotatably secured therein near one end at right angles thereto, a trolley-wheel whose thickness exceeds somewhat the length of the stud, a bearing extending through the wheel axially and having a bushing therein, antifriction-rolls between the bushing and the stud, and a plate secured to the side of the wheel substantially flush therewith and out of contact with the end of the stud and ends of the rolls, said plate covering the wheel-bearing.

WILLIAM J. SUMNER.

Witnesses:
K. I. CLEMONS,
WM. H. CHAPIN.